United States Patent
Chang et al.

(10) Patent No.: US 7,200,686 B2
(45) Date of Patent: Apr. 3, 2007

(54) METHOD, APPARATUS, AND PROGRAM PRODUCT FOR FACILITATING SERIALIZATION OF INPUT/OUTPUT REQUESTS TO A LOGICAL VOLUME ALLOWING NONSERIALIZED INPUT/OUTPUT REQUESTS

(75) Inventors: Joon Chang, Austin, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 10/132,340

(22) Filed: Apr. 25, 2002

(65) Prior Publication Data
US 2003/0204691 A1 Oct. 30, 2003

(51) Int. Cl.
*G06F 13/14* (2006.01)
(52) U.S. Cl. .................. 710/5; 710/6; 710/39
(58) Field of Classification Search ...................... None
See application file for complete search history.

(56) References Cited

U.S. PATENT DOCUMENTS 5,790,868 A * 8/1998 Hotea et al. ................. 710/200
6,665,738 B2 * 12/2003 Vishlitzky et al. ............. 710/4

* cited by examiner

*Primary Examiner*—Ilwoo Park
(74) *Attorney, Agent, or Firm*—Casimer K. Salys; Russell D. Culbertson; The Culbertson Group, P.C.

(57) ABSTRACT

A serialization detection arrangement determines whether a received IO request requires serialization. An overlap detection arrangement then determines if the received IO request produces an impermissible overlap condition. Each IO request producing an impermissible overlap condition is blocked so that it cannot be executed by a storage device while the impermissible overlap condition exists. However, IO requests avoiding an impermissible overlap condition are passed on to the storage device to be executed at the device. Blocking or passing IO requests is preferably performed by an IO request control arrangement. Upon receipt of an IO done signal for a particular IO request, a completion arrangement starts any IO request that had been blocked by the particular IO request and updates the records for both pending requests requiring serialization and blocked IO requests.

21 Claims, 4 Drawing Sheets

METHOD, APPARATUS, AND PROGRAM PRODUCT FOR FACILITATING SERIALIZATION OF INPUT/OUTPUT REQUESTS TO A LOGICAL VOLUME ALLOWING NONSERIALIZED INPUT/OUTPUT REQUESTS

TECHNICAL FIELD OF THE INVENTION

The invention relates to file system or operating system data access requests to a data storage system that allows nonserialized data access requests. More particularly, the invention relates to arrangements for serializing certain data access requests to the data storage system, while leaving other data access requests nonserialized.

BACKGROUND OF THE INVENTION

A data storage arrangement in a data processing system is generally made up of one or more fixed disk drives or other physical storage devices which may be referred to as physical volumes. One or more logical volumes may be defined in a physical storage device or group of physical devices. Data in a logical volume appears to be contiguous to a user, but is usually discontiguous and in fact spread throughout the physical volumes included in the data storage arrangement.

Although each physical storage device has its own device controller operating under the control of its own program code for performing functions at the device, the logical volume or volumes defined in the various storage devices are controlled and managed through software external to the devices themselves. This external software defines, manages, and controls the logical volume or volumes is commonly referred to as a volume manager. The volume manager may be thought of as an intermediary between the operating system or file system and the physical devices that make up the storage arrangement. The logical volume manager may be incorporated into the operating system software for the particular computer system or may be separate from the operating system.

Among the other functions performed by the logical volume manager, the logical volume manager receives data access instructions or requests from the operating system or application software, processes the instructions or requests, issues data access requests to the physical storage devices, and receives and processes information from the physical storage devices indicating that the particular data access instruction or request has been done or performed. The data access requests to be issued to a physical storage device will be referred to in this disclosure and the accompanying claims as input/output request or IO request. These IO requests are commonly issued to the physical storage device or devices through a device driver component included in the logical volume manager. The device driver is responsible for formulating the IO request suitable of use by the physical storage devices and also for receiving signals from the physical storage device or devices regarding the completion of the IO request at the physical device and passing the appropriate information or message back to other components of the logical volume manager. The signal the device driver receives back from the physical storage device indicating the requested data access action has been completed at the device is referred to in this disclosure as an IO done signal or simply an "IO done."

Logical volume managers have historically not allowed overlapping or nonserialized IO requests to be issued to the underlying physical devices. An overlapping or nonserialized IO request is one that specifies the same data storage address or a portion of the same address in the physical storage device as another IO request that has been issued to the physical device or devices and is currently pending completion at the physical storage device. The address locations comprise blocks of storage space and may be referred to as blocks or pages. Logical volumes defined so that they do not allow such overlapping IO requests are referred to as serialized logical volumes. Although there are advantages to serialized logical volumes, serialization requires further processing that may be unnecessary considering that most software applications do not allow actions that would result in overlapping IO requests to the physical devices. Thus, more recent data storage arrangements do not prevent overlapping or nonserialized IO requests. In these data storage arrangements, no overlap checking is done by the logical volume manager or device driver and IO requests are simply issued to the physical storage devices without regard to any overlapping address condition. The logical volumes defined in these data storage arrangements that allow overlapping IO requests may be referred to as nonserialized logical volumes.

Although it may be beneficial in the majority of instances to use nonserialized logical volumes in a data storage arrangement, there may be situations in which it is necessary or desirable to serialize IO requests. Also, there may be situations in which actions that must be taken to accommodate nonserialized volumes slows IO request processing and execution: One example of a situation in which the use of nonserialized logical volumes slows IO request processing is in the case of a write IO request during the time that an operating system is in snapshot mode. In snapshot mode, the operating system creates a copy or snapshot of the file system at a point of time and maintains the snapshot or copy for as long as the user requires. The state of the snapshot or copy must be preservedin the face of operations that would affect the state of the file system. In particular, when a write operation is requested while the file system in snapshot mode, the data, if any, that was at the address to be written to will be lost in lieu of the new data to be written. Thus, while the file system is in snapshot mode a write IO request must be preceded by a read IO request to read the data at the specified address to a buffer memory arrangement. Once the data at the specified address is buffered or stored as necessary to maintain the desired snapshot, the write IO request may be executed to write the new data to the specified memory address. However, because the read IO request and write IO request specify the same address in memory and because the read IO request must be performed before the write IO request is performed, prior art logical volume managers for nonseriafized logical volumes had to hold the write IO request until the read IO request was completed in order to ensure that the read IO request was performed first. Having to hold all write IO requests in this fashion while the file system was operating in snapshot mode effectively slowed the execution of all such write IO requests.

SUMMARY OF THE INVENTION

The invention provides a method, apparatus, and program product for processing IO requests for a data storage arrangement where the data storage arrangement allows nonserialized IO requests. More specifically, the invention provides a method, apparatus, and program product for serializing IO requests as desired, while continuing to process other IO requests that are not serialized.

The method of the invention includes the step of determining whether a respective IO request requires serialization. This step is preferably performed by a serialization detection arrangement comprising a suitable processing device operating under the control of serialization detection program code. The method also includes determining if the respective IO request produces an impermissible overlap condition. This impermissible overlap detection is preferably performed by an overlap detection arrangement comprising a processing device operating under the control of overlap detection program code. As used in this disclosure and the accompanying claims, a particular IO request produces an impermissible overlap condition when the particular IO request specifies the address or a portion of an address specified in another pending IO request, and either the first IO request or the pending IO request is specified as requiring serialization. Each IO request producing an impermissible overlap condition is blocked so that it cannot be executed by the storage device while the impermissible overlap condition exists. However, IO requests avoiding an impermissible overlap condition are passed on to the storage device to be executed at the device. Blocking or passing IO requests according to the invention is preferably performed by an IO request control arrangement comprising a processing device operating under the control of IO request control program code.

The invention also includes a completion process performed by a completion arrangement comprising a processing device operating under the control of completion program code. The completion arrangement receives IO done signals from the storage devices and starts any IO requests that have been blocked by the IO request specified in the IO done signal. The completion arrangement also updates the records being maintained for pending IO requests requiring serialization and pending IO requests that are blocked.

For the purposes of this disclosure and the following claims, an incoming IO request being processed according to the invention will be referred to as a first IO request. This first IO request is to be distinguished from g subsequent or second IO request that may be blocked by the first IO request. The first IO request, that is, the IO request currently being processed according to the invention is also to be distinguished from currently pending IO requests that were received by the invention before the first IO request.

If the first IO request requires serialization, the step of determining if the first IO request produces an impermissible overlap condition includes searching one or more currently pending IO requests for an overlap with the first IO request. For first IO requests that do not require serialization, the invention first determines if there are any currently pending IO requests that do require serialization. The method then includes searching any currently pending IO request requiring serialization for overlaps with the received IO request.

In one preferred implementation, the invention includes the step of maintaining a serialization record for each IO request requiring serialization. This record may be maintained using a suitable counter and is used in the method to determine whether any currently pending IO requests require serialization.

Regardless of the manner in which an IO request is blocked according to the present invention, the invention preferably includes the step of maintaining a blocked request record for each IO request that is blocked. This blocked request record may be maintained using a counter that simply holds a count of all blocked IO requests.

As IO done signals are received from the storage device that actually executes the IO requests in the data storage arrangement, the serialization records and the blocked request records are updated as necessary so that the records accurately reflect both whether there is a pending IO request requiring serialization and whether there is a blocked IO request. In the preferred implementation in Which the record for IO requests requiring serialization is maintained using a serialization counter, the invention includes decrementing the serialization counter when an IO done is received for an IO request that required serialization. In the form of the invention in which blocked IO request records are maintained using a blocked request counter, the invention includes starting the IO request that had been blocked and updating the counter or other tracking device in response to an IO done received for an IO request that caused another IO request to be blocked.

The invention has particular application for use with nonserialized logical volumes while the operating system is in snapshot mode. In this application, the invention includes the step of determining if an incoming IO request interferes with a file system snapshot. As used in this disclosure and the accompanying claims, an incoming IO request interferes with a file system snapshot when the incoming IO request would irretrievably modify the state of the file system from that state present at the point in time of the file system copy or snapshot. In the event that the incoming IO request interferes with the file system snapshot, the invention includes the step of replacing the incoming IO request with two separate IO requests that require serialization. The first IO request comprises a read request that preserves the desired snapshot of the file system, and the second IO request comprises a write request that performs the originally requested modification. Issuing the two IO requests requiring serialization ensures that the state of the file system is preserved for the snapshot function, but allows the originally submitted IO request to be issued to the storage device immediately after an IO done is received for the first IO request and without having to wait for the first IO request to be completed.

The snapshot protection steps according to the invention are performed by a snapshot protection arrangement. This snapshot protection arrangement preferably comprises the same processing device used to perform the other processing functions according to the invention. This processing device operates under the control of snapshot protection program code to perform the above-described snapshot protection function.

These and other objects, advantages, and features of the invention will be apparent from the following description of the preferred embodiments, considered along with the accompanying drawings.

DESCRIPTION OF PREFERRED EMBODIMENTS

Figure 1:
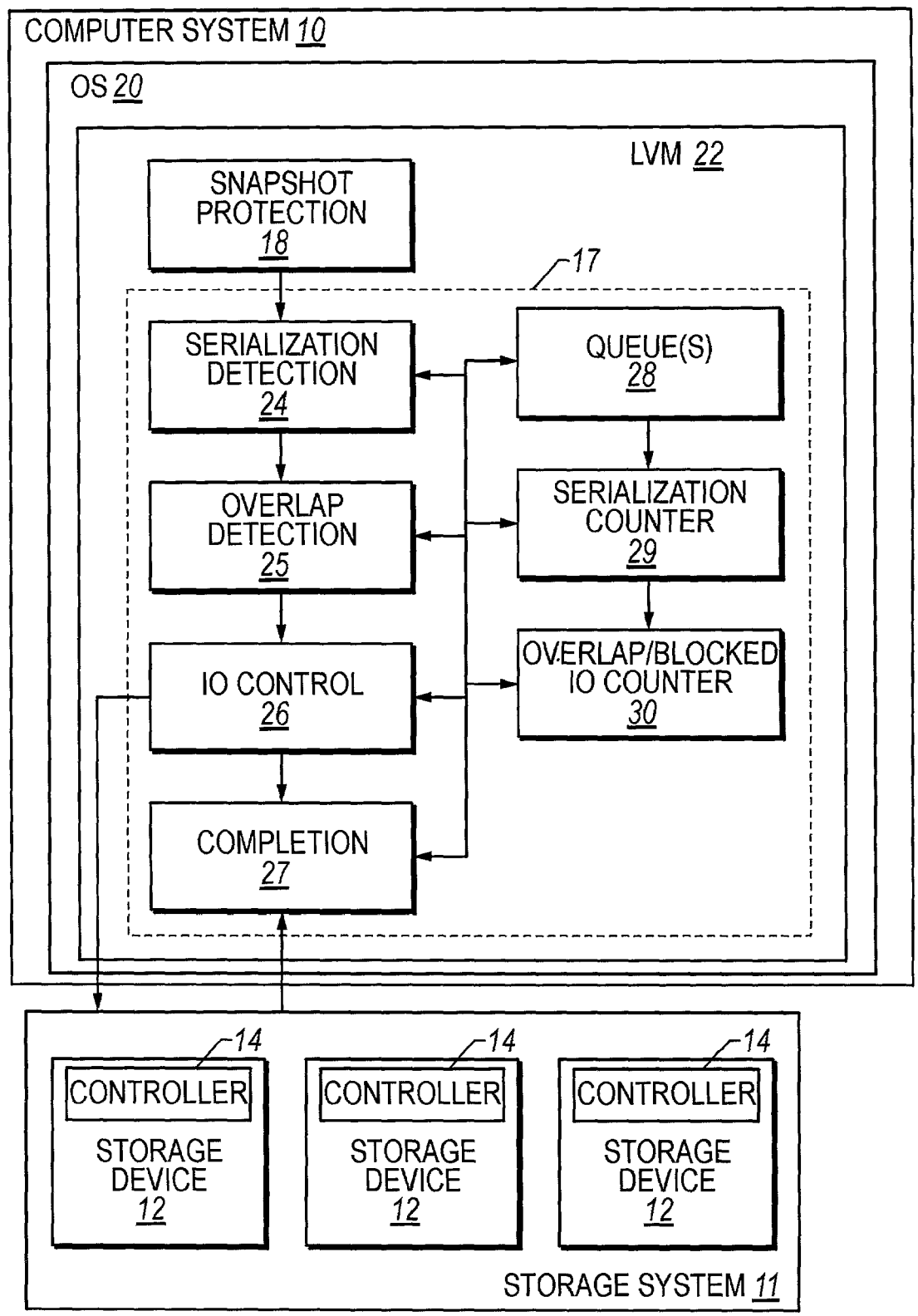
FIG. 1 is a diagrammatic representation of an IO request processing arrangement embodying the principles of the present invention.

The present invention is implemented in a computer system 10 using a physical storage device arrangement 11. Physical storage device arrangement 11 may be incorporated in computer system 10 or implemented in a separate system and will commonly include a number of separate storage devices 12 such as an array of disk drives. Three separate storage devices are shown in FIG. 1 for purposes of example. It will be appreciated that the invention is not limited to any particular number of storage devices. Regardless of the number of storage devices included in the storage arrangement, each storage device 12 will generally include its own controller or processing element 14 for directly controlling the operation of the respective storage device.

The basic components making up the preferred form of the invention are shown in dashed box 17 in FIG. 1. These basic components together with a snapshot protection arrangement 18 form part of the operating system for computer system 10. The operating system is shown diagrammatically at reference numeral 20 in FIG. 1. More particularly, the basic components of the invention shown in dashed box 17 are preferably implemented within the device driver portion of a logical volume manager 22 for operating system 20.

Referring now to the contents of dashed box 17, the illustrated preferred form of the invention includes a serialization detection arrangement 24 and an overlap detection arrangement 25. The preferred form of the invention also includes an IO request control arrangement 26 and a completion arrangement 27. One or more IO request queues 28 are utilized in the preferred arrangement together with a serialization counter 29 and an overlap counter 30. IO request queue arrangement 28 is used to store pending IO requests while the two counters 29 and 30 are used as tracking devices for tracking or maintaining records of the received IO requests requiring serialization and the IO requests that have been blocked according to the invention. These functions together with the functions of the other components shown in dashed box 17 will be described below with reference to FIGS. 2 and 3. The operation of snapshot protection arrangement 18 will be described below with reference to FIG. 4.

It will be appreciated that the various elements shown within computer system 10 in FIG. 1 are preferably implemented through operational program code executed by a suitable processor in the computer system. Alternatively to being executed by the general purpose processors available in computer system 10, some or all of the functions described below with reference to the flow charts may be carried out by special purpose processing devices. This special purpose processor alternative should be considered equivalent to the general purpose computer implementation.

The operation of the serialization detection arrangement 24, overlap detection arrangement 25, IO request control arrangement 26, and the method of serializing desired IO requests according to the invention may be described with reference to FIG. 2. Within the flow chart, the process step shown in dashed box 32 comprises the step performed by serialization detection arrangement 24 in FIG. 1 under the control of serialization detection program code. The process steps shown in dashed box 33 comprise the steps performed by overlap detection arrangement 25 under the control of overlap detection program code. The remaining steps shown in FIG. 2 other than the initialization step and the receipt of an IO request are steps performed by IO control arrangement 26 under the control of IO request control program code. In the following discussion, references to the various arrangements themselves are references to FIG. 1, whereas references to process steps or groups of process steps are references to the particular flowchart.

After initialization, the serialization arrangement, shown generally at 17 in FIG. 1, waits for receipt of an IO request from the other logical volume manager components. It will be appreciated that the IO request originates from operating system 20 or a software application (not shown) and is processed by other logical volume manager components prior to issuance to the serialization arrangement 17. Upon receipt of an incoming or first IO request at block 35 in FIG. 2, serialization detection arrangement 24 determines whether the first IO request requires serialization as shown at decision block 37. This determination may be made in any of a number of different ways within the scope of the accompanying claims. For example, the IO request may include a code indicating that it requires or does not require serialization. Alternatively, each different type of IO request may be defined as an IO request requiring serialization or not requiring serialization, and the determination at block 37 may be made simply by identifying the particular type of IO request. Regardless of how the determination is made at decision block 37, the process then proceeds to the functions performed by the overlap detection arrangement shown generally in dashed box 33.

Overlap detection arrangement 25 performs processes that follow two separate process branches. The branch on the left in FIG. 2 is performed in the event the first IO request requires serialization while the process branch on the right is performed in the event the first IO request does not require serialization.

Referring first to the branch on the left, if the first IO request requires serialization, the invention includes maintaining a record regarding the receipt of that IO request as shown at process block 39. The record is preferably maintained by incrementing serialization counter 29 shown in FIG. 1. Serialization counter 29 represents a tracking device for tracking the number of IO requests requiring serialization that are currently pending. That is, serialization counter 29 and the recording step shown at process block 39 maintain a record of the number of IO requests requiring serialization that have been received by the device driver but which have not been performed or executed by the respective storage device 12.

Figure 2:
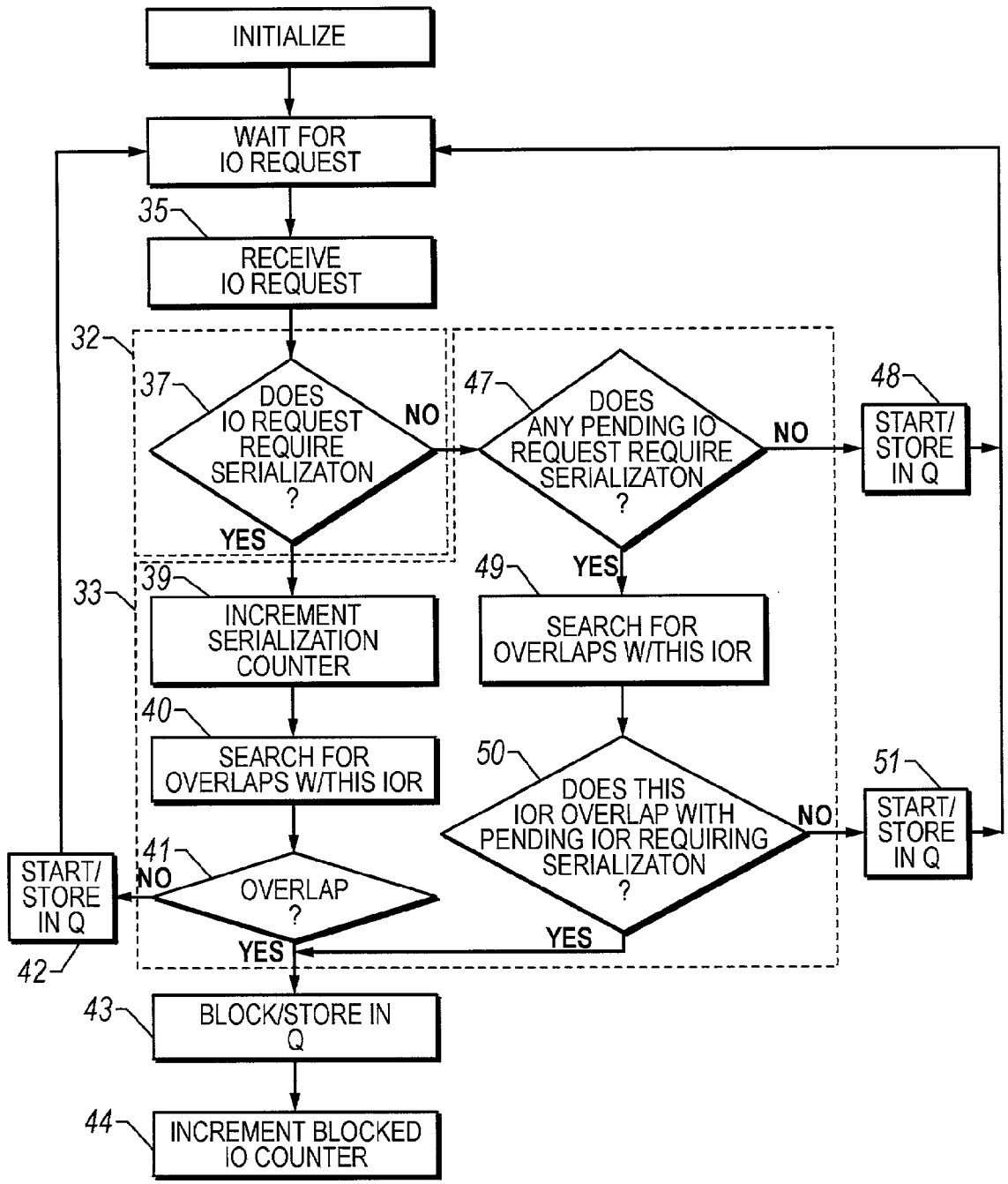
FIG. 2 is a flowchart showing process steps for selectively blocking IO requests to a nonserialized logical volume according to the invention to ensure that certain IO requests are serialized.

As shown at process block 40 in FIG. 2, after producing the desired serialization record, the invention includes searching for pending IQ requests that overlap with the first IO request. This search involves analyzing the addresses specified by the pending IO requests and determining if the address specified by the first IO request includes any portion of an address specified in a pending IO request. This address comparison is performed against all pending IO requests. In order to facilitate the required address comparison step, all pending IO requests (or a pointer for each IO request) are preferably stored in a queue such as the queue arrangement shown at 28 in FIG. 1. The required address comparison operation is well within the skill of those of ordinary skill in the art, and will not be discussed further here so as not to obscure the invention in unnecessary detail.

The process branches again at decision block 41. If no address overlap is detected with pending IO requests, the invention proceeds to the step of starting or initiating the first IO request and storing the request as indicated at process block 42. In the preferred form of the invention, the IO request starting or initiating step comprises communicating the appropriate instruction to the storage device 12 to be performed. Also, storing the request comprises storing the first IO request in the pending IO request queue arrangement 28 shown in FIG. 1.

If it is determined at decision block 41 that the address specified in the first IO request IO overlaps with a pending IO request, the invention includes blocking the first IO request and storing the blocked IO request in the queue arrangement as shown at process block 43. The process then proceeds to maintain a record that the first IO request has been blocked as shown at process block 44. This step is preferably accomplished by incrementing the overlap counter 30 shown in FIG. 1. In any event, the record produced at block 44 at least maintains an indication that an IO request has been blocked, and perhaps further information to facilitate processing. The processes shown in blocks 42, 43, and 44 represent processes performed by IO request control arrangement 26 shown in FIG. 1.

The process branch on the right in dashed box 33 in FIG. 2 is taken in the event that the first IO request does not require serialization as determined at decision block 37. In that case, the invention preferably includes checking the device maintaining the record of received IO requests requiring serialization to determine if there are any pending IO requests that require serialization. The step of checking for pending IO requests requiring serialization is shown at decision block 47. In the preferred form of the invention in which serialization counter 29 is used to maintain the record of pending IO requests requiring serialization, this inquiry may simply comprise a check of the value held in the serialization counter 29. If the value held in serialization counter 29 is not equal to zero, then there is at least one pending IO request requiring serialization. If the counter value does equal zero, then there is no pending IO request requiring serialization.

Regardless of how the determination is made at decision block 47, if there is no pending IO request requiring serialization, the invention includes starting or initiating the first IO request and storing the first IO request in the appropriate queue as shown at process block 48. These functions are similar to those described above with reference to process block 42. The system initiates the IO request by communicating the appropriate instruction to the storage device (12 in FIG. 1).

If the inquiry at decision block 47 indicates there are pending IO requests that require serialization, the method proceeds to process block 49 and the step of searching for overlaps with the first IO request. This search is a search for pending IO requests requiring serialization that specify an address in common with the first IO request The preferred form of the invention includes searching for overlaps only for executing IO requests requiring serialization, that is, IO requests that have been communicated to the storage device 12. However, other forms of the invention may search for overlaps with any pending IO request whether they are currently executing or not. The process then branches at decision block 50. If the search shown at block 49 indicates that there is no pending or executing IO request requiring serialization that specifies an address overlapping with the address specified in the first IO request, the method includes starting the IO request and storing the request in the appropriate queue as shown at block 51. These operations are similar to those shown at process block 48. If the search conducted at process block 49 indicates that there is a pending or executing IO request requiring serialization that specifies an address overlapping with the address specified in the first IO request, the process proceeds to blocks 43 and 44. As described above, the process includes blocking and storing the IO request at block 43 and making a record that the IO request is being blocked at process block 44. The process steps indicated at blocks 48 and 51 are processes performed by the IO control arrangement 26 in FIG. 1 together with the steps performed at blocks 42,43, and 44.

Pending IO requests may be stored or queued in several alternate fashions within the scope of the present invention. One form of the invention uses a single queue that stores both IO requests requiring serialization and IO requests that do not require serialization. In this embodiment, the searches indicated at blocks 40 and 49 in FIG. 2 both involve searching this single queue. Alternatively, IO requests requiring serialization are stored in one queue and IO requests not requiring serialization are stored in another queue. In this implementation, both queues must be searched in order to perform the overlap search indicated at process block 40 in FIG. 2. However, the search for overlaps indicated at process block 49 may be performed by simply searching the queue storing pending IO requests that require serialization. Such a queue may also be used to perform the inquiry indicated at process block 47. That is, the determination as to whether there are any pending IO requests requiring serialization may simply involve checking the queue for IO requests requiring serialization to see if there are any valid entries in the queue. Although either the single or double queue structures may be employed for queuing arrangement 28 in FIG. 1, the invention should not be construed as being limited to these queuing arrangements. Rather, the invention encompasses any queuing arrangement facilitating the functionality described in FIG. 2.

Figure 3:
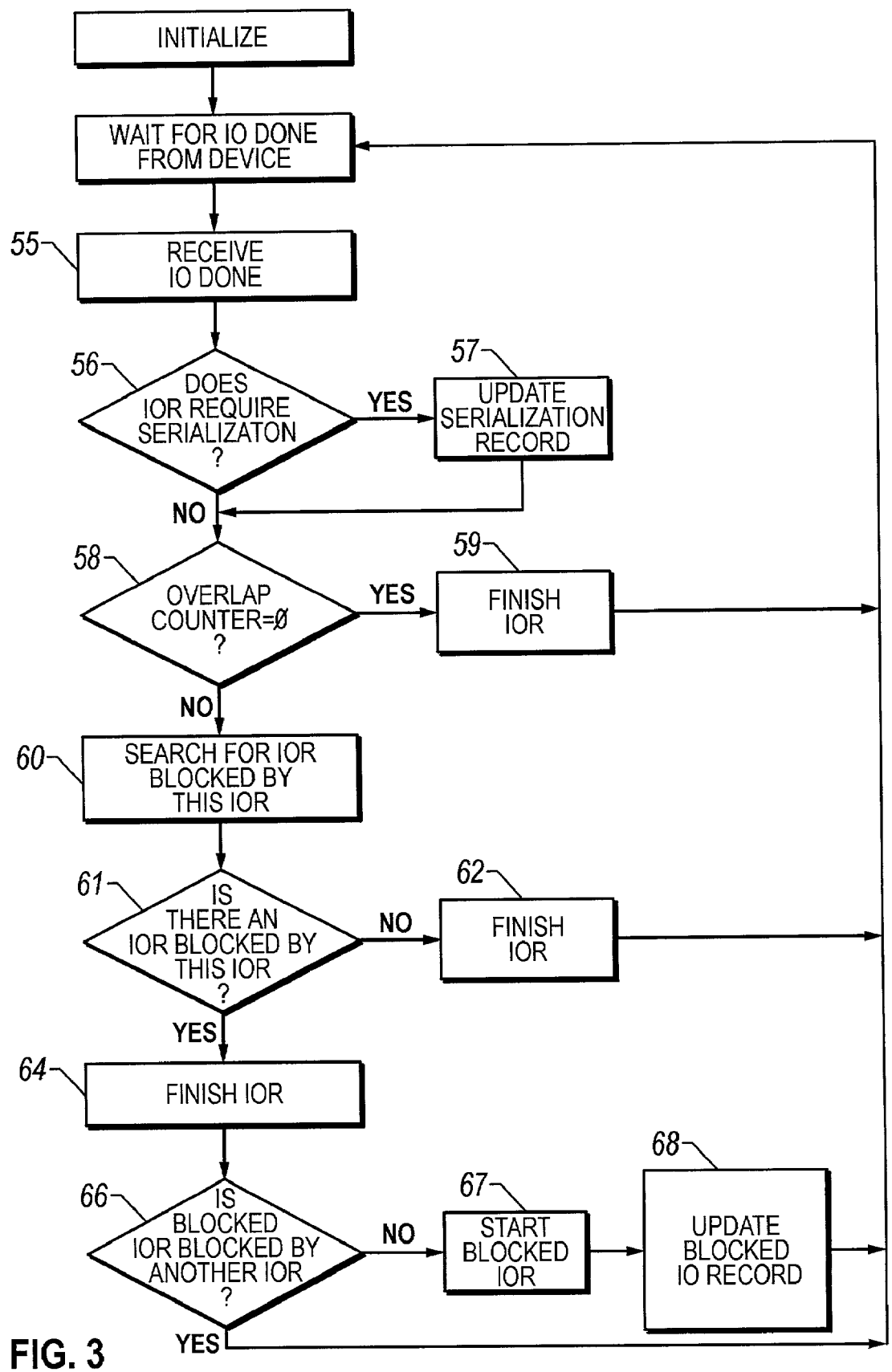
FIG. 3 is a flowchart showing the preferred process steps for completing an IO request.

FIG. 3 shows the preferred process steps performed by completion arrangement 27 shown in FIG. 1. After system initialization, the invention includes waiting for an IO done signal transmitted from the storage device 12. Upon receipt of an IO done signal at process block 55, the invention includes determining whether the IO request for which the IO done signal is received requires serialization. This determination is shown at decision block 56 in FIG. 3. If the IO request specified in the IO done signal did require serialization, the process updates the records used to indicate the presence of pending IO requests requiring serialization as shown at process block 57. This updating step preferably includes decrementing serialization counter 29 shown in FIG. 1.

After the updating step shown at process block 57, or in the event the IO request specified by the received IO done signal did not require serialization, the process proceeds to decision block 58. At this point, completion arrangement 27 determines whether there are any pending IO requests that have been blocked. Where the arrangement for maintaining a record of blocked IO requests comprises overlap counter 30, the step indicated at decision block 58 may involve simply checking the value of the overlap counter. If the value held by the counter is equal to zero, then there are no pending IO requests currently being blocked, whereas a nonzero value indicates that there is at least one pending IO request that is currently being blocked. Regardless of how the determination is made, if there are no pending IO requests currently being blocked, the invention includes simply finishing or completing the indicated IO request as shown at process block 59. This step involves communicating to the other logical volume manager processes that the particular IO request has been executed by the respective physical storage device or devices 12.

If the inquiry at decision block 58 to determine if there is a pending IO request currently blocked indicates that there is such a blocked IO request, the invention proceeds to the step of searching for any IO requests that are blocked by the IO request specified by the received IO done signal. This search is shown at process block 60 and may be accomplished in any suitable fashion. If there is no IO request blocked by the IO request specified by the received IO done signal as indicated at decision block 61, the invention proceeds to finish or complete the IO request indicated by the received IO done signal at process block 62, similarly to the step at block 59.

In the event there is an IO request blocked by the IO request specified by the received IO done signal, as indicated by an affirmative outcome at decision block 61, the process proceeds to finish or complete the IO request specified by the received IO done, signal at block 64 similarly to the finishing/completion steps at blocks 59 and 62. However, in addition to finishing or completing the specified IO request, the invention also includes determining if the blocked IO request is blocked by another pending IO request as indicated at decision block 66. If the blocked IO request is not blocked by another pending IO request, the invention includes starting the blocked IO request as indicated process block 67 and updating the blocked IO request record as shown at process block 68. This updating step may comprise decrementing the overlap counter 30 shown in FIG. 1. However, if the IO request identified at decision block 61 is still blocked by another IO request as indicated by an affirmative outcome at decision block 66, no action is taken and the process returns to wait for the next IO done received from the storage device 12.

Figure 4:
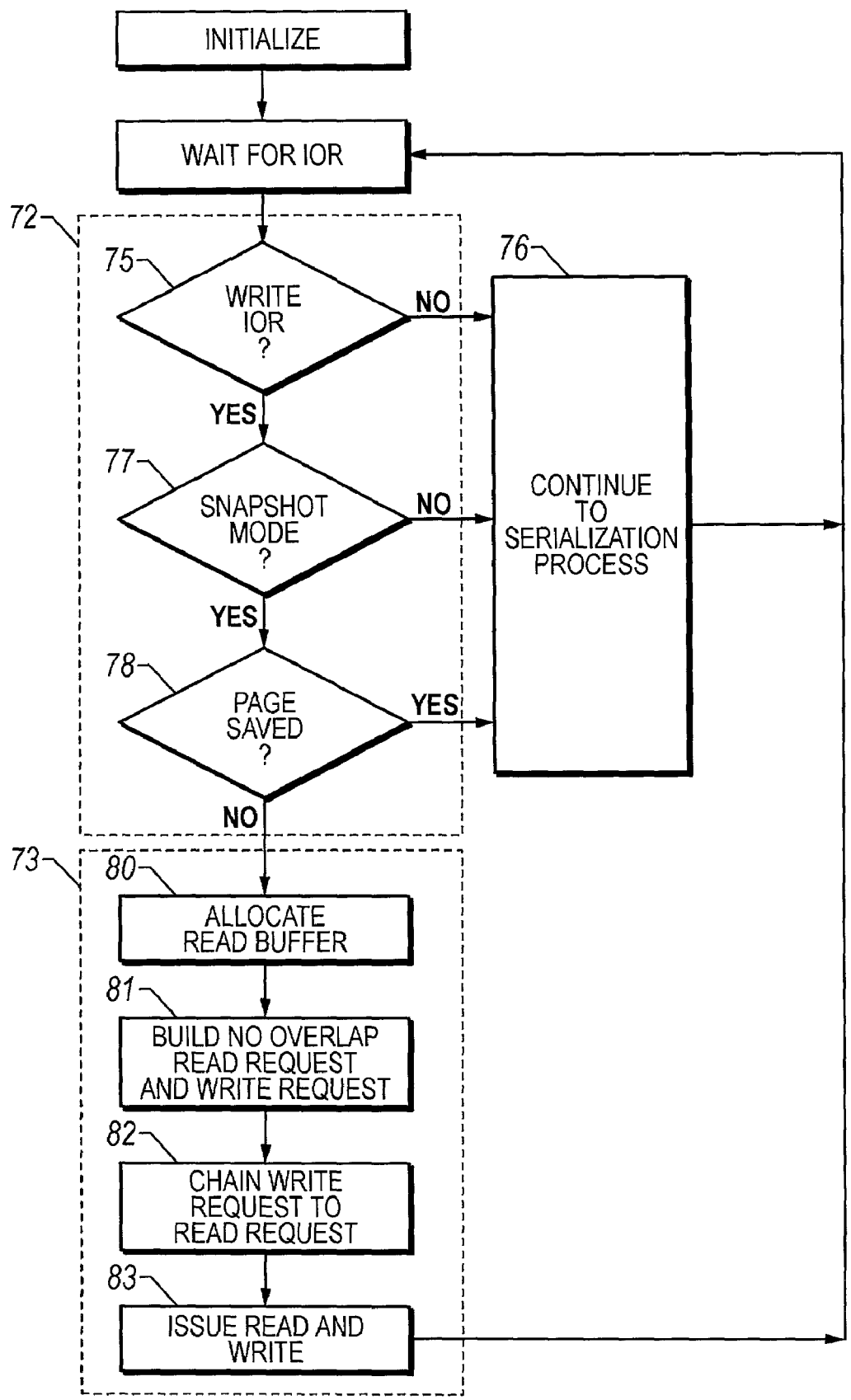
FIG. 4 is a flowchart showing steps embodying the principles of the invention for protecting a file system snapshot.

FIG. 4 shows the preferred process steps performed by the snapshot protection arrangement 18 shown in FIG. 1. The purpose of this snapshot protection process is to more quickly process an incoming write request while protecting the file system snapshot while the system is in snapshot mode.

Upon receipt of an IO request, the invention includes first determining whether the IO request will interfere with a file system snapshot being maintained by the system. The preferred sequence of inquiries to identify interfering IO requests is shown in dashed box 72. If the inquiries included in dashed box 72 indicate that the IO request is one that would interfere with a file system snapshot, the system takes a series of actions shown in dashed box 73 to protect the snapshot and allow the IO request to be processed more rapidly.

Referring to dashed box 72, the preferred method for detecting IO requests that would interfere with a file system snapshot includes three inquiries. The first inquiry, shown at decision block 75, is whether the incoming or first IO request is a write request. Only write requests can interfere with a file system snapshot. Thus no special steps are required to protect the file system snapshot if it is determined that the first IO request is not a write request, and the IO request may be processed normally as indicated at process block 76. That is, IO requests other than write requests are simply passed on to the serialization processes described above with reference to FIG. 2, and snapshot protection arrangement awaits receipt of the next incoming IO request. The second inquiry to determine whether the first IO request will interfere with a file system snapshot is shown at decision block 77 in FIG. 4. Because interference with a snapshot may occur, only when the operating system is in snapshot mode and is maintaining a file system snapshot, the inquiry at decision block 77 is to determine if the operating system is presently in snapshot mode and maintaining a file system snapshot. If no file system snapshot is being maintained, the process continues to block 76 and the IO request is passed on for the further processing described with reference to FIG. 2. However, since it has already been determined that the IO request is a write request, and if the inquiry at decision block 77 indicates that the system is in snapshot mode, then it is possible that executing the write operation would change the file system state and thus interfere with the snapshot.

The third and final inquiry to determine if the IO request will interfere with the file system snapshot is shown at process block 78 and comprises determining if the address specified in the write request has been saved or preserved before. If the data at the specified address has been saved, then the file system snapshot has been preserved and the write request can be executed without changing the snapshot. Thus, an affirmative result at decision block 78 causes the process to branch to block 76. The IO request is passed on for further processing as shown in FIG. 2, and the snapshot protection arrangement awaits the next incoming IO request. However, if the address specified in the write request has not been saved before, then execution of the write request would interfere with the file system snapshot that is being maintained by the operating system m snapshot mode. In order to protect the file system snapshot, the process continues to the process steps shown in dashed box 73.

The snapshot protection steps shown in dashed box 73 include allocating a read buffer as indicated at process block 80. This buffer will hold the data currently held at the address specified in the write request being processed. The snapshot protection process then includes building both a read request requiring serialization and a write request requiring serialization as indicated at process block 81. The write request and read request are then preferably chained together as shown at process block 82 and the read request is issued to be processed as shown in FIG. 2. Chaining the read and write requests ensures that the read request is processed ahead of the write request issued through the snapshot protection process shown in FIG. 4.

The read request issued through block 83 in FIG. 4, is processed through blocks 35, 37, 39, 40, and 41 in FIG. 2, and is ultimately issued to the storage devices (12 in FIG. 1) for execution and stored in the pending IO request queue. The chained write request is also processed through process blocks 35, 37, 39, 40, and 41. However, because the write request specifies the same address as the immediately preceding read request which has now been issued to execution, the inquiry at block 41 in FIG. 2 indicates an address overlap. The overlap condition causes the process to branch to process blocks 43 and 44 in FIG. 2, and the write request is blocked or prevented from being issued to the storage devices for execution. The write request remains blocked until the storage device controller issues an IO done signal for the read request. Once the IO done signal is issued for the read request, the process proceeds through blocks 56, 57, 58, 60, 61, 64, 66, 67, and 68 in FIG. 3. That is, the outcome at decision block 58 indicates that an IO request, specifically the write request, is blocked. Thus, the process searches for the blocked IO request as shown at process block 60 and an affirmative outcome is produced at decision block 61. At this point, the read request is finished or completed as shown at 64 in FIG. 3. The write request should not be blocked by another executing IO request, and thus the write request is started as shown at process block 67 in FIG. 3 and the blocked IO recording arrangement is updated as shown at block 68. It will be noted that the write request is issued for execution in response to the issuance of the IO done for the chained read request. The write request does not have to wait for the read request to be completed before being issued to the storage devices for execution. Thus, the snapshot protection process according to the invention, in cooperation with the selective serialization process according to the invention, places the write request in position to be acted upon immediately after it can be assured that it will not be executed before the read request. This effectively speeds the processing of write requests to a nonserialized volume when the operating system is in snapshot mode.

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A method for processing an IO request for a data storage arrangement where the data storage arrangement allows nonserialized IO requests, the method including the steps of:
    (a) performing a snapshot protection process for an incoming IO request, the snapshot protection process including (i) determining if the incoming IO request interferes with a file system snapshot mode, and (ii) in the event the incoming IO request interferes with the file system snapshot mode, replacing the incoming IO request with a read request requiring serialization and a write request requiring serialization chained to the read request;
    (b) after performing the snapshot protection process for the incoming IO request, determining if a first IO request requires serialization, the first IO request comprising either the incoming IO request in the event the incoming IO request does not interfere with the file system snapshot mode, or the read request requiring serialization in the event the incoming IO request interferes with the file system snapshot mode;
    (c) determining if the first IO request produces an impermissible overlap condition;
    (d) blocking execution of the first IO request if the first IO request produces the impermissible overlap condition; and
    (e) initiating execution of the first IO request if the first IO request avoids the impermissible overlap condition.

2. The method of claim 1:
    (a) further including the step of maintaining a serialization record for the first IO request in the event that the first IO request requires serialization; and
    (b) wherein the step of determining if the first IO request produces an impermissible overlap condition includes searching one or more pending IO requests for an overlap with the first IO request.

3. The method of claim 1 wherein the step of determining if the first IO request produces an impermissible overlap condition includes the steps of:
    (a) determining if there is a pending IO request requiring serialization; and
    (b) upon detection of the pending IO request requiring serialization, searching one or more pending IO requests for overlaps with the first IO request.

4. The method of claim 1 further including the step of maintaining a blocked request record in the event that the first IO request is blocked.

5. The method of claim 1 wherein the first IO request requires serialization and further including the step of updating a serialization tracking device upon receipt of an IO done signal for the first IO request.

6. The method of claim 1 wherein the first IO request caused a second IO request to be blocked and further including the step of initiating the second IO request upon receipt of an IO done signal for the first IO request.

7. The method of claim 6 further including the step of updating a blocked IO request tracking device upon initiation of the second IO request.

8. An apparatus for processing IO requests for a data storage arrangement where the data storage arrangement allows nonserialized IO requests, the apparatus including:
    (a) a snapshot protection arrangement for determining if an incoming IO request interferes with a file system snapshot mode, and, in the event the incoming IO request interferes with the file system snapshot mode, replacing the incoming IO request with a chained read request and write request requiring serialization;
    (b) a serialization detection arrangement for determining if a first IO request requires serialization, the first IO request comprising either the incoming IO request in the event the incoming IO request does not interfere with the file system snapshot mode, or the read request of the chained read request and write request requiring serialization in the event the incoming IO request interferes with the file system snapshot mode;
    (c) an overlap detection arrangement for determining if the first IO request produces an impermissible overlap condition; and
    (d) an IO request controlling arrangement for blocking execution of the first IO request in the event the first IO request produces the impermissible overlap condition and for initiating execution of the first IO request in the event the first IO request avoids the impermissible overlap condition.

9. The apparatus of claim 8 wherein the overlap detection arrangement is also for searching pending IO requests for an overlap with the first IO request, and for maintaining a record of the first IO request in the event that the first IO request requires serialization.

10. The apparatus of claim 8 wherein the overlap detection arrangement is also for determining if there is a pending IO request requiring serialization, and upon detection of the pending IO request requiring serialization, searching one or more pending IO requests for overlaps with the first IO request.

11. The apparatus of claim 8 wherein the overlap detection arrangement further includes a blocked IO request tracking device for maintaining a blocked request record in the event that the first IO request is blocked.

12. The apparatus of claim 8 further including a completion arrangement for updating a serialization tracking device upon receipt of an IO done signal for the first IO request in the event that the first IO request requires serialization.

13. The apparatus of claim 8 further including a completion arrangement for initiating a second IO request upon receipt of an IO done signal for the first IO request, the second IO request comprising a respective IO request that had previously been blocked by the first IO request.

14. The apparatus of claim 13 wherein the completion arrangement is also for updating a blocked IO request tracking device upon initiation of the second IO request.

15. A program product for processing IO requests for a data storage arrangement where the data storage arrangement allows nonserialized IO requests, the program product being stored on a computer readable medium and including:

(a) snapshot protection program code for determining if an incoming IO request interferes with a file system snapshot mode, and, in the event the incoming IO request interferes with the file system snapshot mode, replacing the incoming IO request with a chained read request and write request requiring serialization;

(b) serialization detection program code for determining if a first IO request requires serialization, the first IO request comprising either the incoming IO request in the event the incoming IO request does not interfere with the file system snapshot mode, or the read request of the chained read request and write request requiring serialization in the event the incoming IO request interferes with the file system snapshot mode;

(c) overlap detection program code for determining if the first IO request produces an impermissible overlap condition; and (d) IO request controlling program code for blocking execution of the first IO request in the event the first IO request produces the impermissible overlap condition, and for initiating execution of the first IO request in the event the first IO request avoids the impermissible overlap condition.

16. The program product of claim 15 wherein the overlap detection program code is also for searching pending IO requests for an overlap with the first IO request, and for maintaining a record of the first IO request in the event that the first IO request requires serialization.

17. The program product of claim 15 wherein the overlap detection program code is also for determining if there is a pending IO request requiring serialization, and upon detection of the pending IO request requiring serialization, searching the pending IO request and any other pending IO requests for overlaps with the first IO request.

18. The program product of claim 15 wherein the overlap detection program code further includes a blocked IO request tracking element for maintaining a blocked request record in the event that the first IO request is blocked.

19. The program product of claim 15 further including completion program code for updating a serialization tracking element upon receipt of an IO done signal for the first IO request in the event that the first IO request requires serialization.

20. The program product of claim 15 further including completion program code for initiating a second IO request upon receipt of an IO done signal for the first IO request, the second IO request comprising a respective IO request that had previously been blocked by the first IO request.

21. The program product of claim 20 wherein the completion program code is also for updating a blocked IO request tracking element upon initiation of the second IO request.

* * * * *